US007716715B2

(12) United States Patent
Kuang

(10) Patent No.: US 7,716,715 B2
(45) Date of Patent: May 11, 2010

(54) INTERACTIVE MEDIA SYSTEM

(76) Inventor: Shaobo Kuang, 1243 Meadowview Cir., Lansdale, PA (US) 19446

( * ) Notice: Subject to any disclaimer, the term of this patent is extended or adjusted under 35 U.S.C. 154(b) by 1197 days.

(21) Appl. No.: 10/753,227

(22) Filed: Jan. 8, 2004

(65) Prior Publication Data

US 2004/0178923 A1 Sep. 16, 2004

Related U.S. Application Data

(60) Provisional application No. 60/438,817, filed on Jan. 10, 2003.

(51) Int. Cl.
*H04N 7/16* (2006.01)

(52) U.S. Cl. .......................... 725/141; 725/40; 725/43; 725/48; 725/51; 348/461; 348/473; 348/564

(58) Field of Classification Search ................ 455/3.03, 455/3.05
See application file for complete search history.

(56) References Cited

U.S. PATENT DOCUMENTS

| | | | | |
|---|---|---|---|---|
| 6,018,372 | A * | 1/2000 | Etheredge | 725/44 |
| 2002/0035404 | A1 * | 3/2002 | Ficco et al. | 700/65 |
| 2002/0097872 | A1 * | 7/2002 | Maliszewski | 380/217 |
| 2002/0140571 | A1 * | 10/2002 | Hayes et al. | 340/825.72 |
| 2002/0162121 | A1 * | 10/2002 | Mitchell | 725/135 |
| 2002/0195495 | A1 * | 12/2002 | Melick et al. | 235/462.01 |
| 2003/0005462 | A1 * | 1/2003 | Broadus et al. | 725/110 |
| 2003/0112273 | A1 * | 6/2003 | Hadfield et al. | 345/751 |
| 2003/0226144 | A1 * | 12/2003 | Thurston et al. | 725/39 |
| 2005/0005288 | A1 * | 1/2005 | Novak | 725/32 |
| 2005/0283737 | A1 | 12/2005 | Ha | |

* cited by examiner

*Primary Examiner*—Joseph P Hirl
*Assistant Examiner*—Joshua Taylor

(57) ABSTRACT

An interactive media system includes a broadcasting device for broadcasting TV signals, and a receiving device for receiving TV signals. The TV signals, such as a TV commercial, contain screen related action codes that include device type, action type and other information. The receiving device includes storage for storing the reference address for other home electronic devices, and a button on a remote controller for the users to start interactive with the interactive media system. When the user presses the button, the receiving device will send the action codes to the designated other home device or another TV screen channel, to allow users to perform the action on the other home device instead of performing the action on TV. The system also allows users just use number keys/buttons on the remote controller to navigate web on TV.

1 Claim, 10 Drawing Sheets

Action Codes Examples:

| Device Type | Action Type | Start Time | End Time | Details | Submit |
|---|---|---|---|---|---|
| VCR | Record | 7:30 pm | 9:30 pm | CHN 41 | No |
| PC | www.order.com | | | 76ers game ticket | Yes |
| Digital TV | Down Load | | | 76ers previous game | Yes |
| Phone | Call | | | 1800-8888 | No |
| Cellular Phone | Send Message | | | talk@hotmail.com | Yes |

Fig. 4

Address Table:

| Device Name | Device Type | Address |
|---|---|---|
| My VCR | VCR | 10.1.1.10 |
| My DVD | DVD Player | 10.1.1.11 |
| My PC1 | PC | 10.1.1.20 |
| My PC 2 | PC | 10.1.1.21 |
| My phone | Phone | 10.1.1.30 |
| My Cellular Phone | Cellular Phone | 10.1.1.40 |
| My XBOX | Game Console | 10.1.1.50 |
| MY TV | TV Display Terminal | 10.1.1.60 |

Fig. 5

| | |
|---|---|
| **Regional**<br>Countries, Regions, US States... | **Business & Economy**<br>B2B, Finance, Shopping, Jobs... |
| **Society & Culture**<br>People, Environment, Religion... | **Computers & Internet**<br>Internet, WWW, Software, Games... |
| **Education**<br>College and University, K-12... | **News & Media**<br>Newspapers, TV, Radio... |
| **Arts & Humanities**<br>Photography, History, Literature... | **Entertainment**<br>Movies, Humor, Music... |
| **Science**<br>Animals, Astronomy, Engineering... | **Recreation & Sports**<br>Sports, Travel, Autos, Outdoors... |
| **Social Science**<br>Languages, Archaeology, Psychology... | **Health**<br>Diseases, Drugs, Fitness... |
| **Reference**<br>Phone Numbers, Dictionaries, Quotations... | **Government**<br>Elections, Military, Law, Taxes... |

Fig. 7

❷ Regional
Countries, Regions, US States...

❸ Business & Economy
B2B, Finance, Shopping, Jobs...

❹ Society & Culture
People, Environment, Religion...

❺ Computers & Internet
Internet, WWW, Software, Games...

❻ Education
College and University, K-12...

❼ News & Media
Newspapers, TV, Radio...

❾ Arts & Humanities
Photography, History, Literature...
...

❿ Entertainment
Movies, Humor, Music...

Recreation & Sports...

Fig. 8

| Number | Command | Position |
|---|---|---|
| 1 | | |
| 2 | <a href=http://ww.yahoo.com/r/re> | Row 2, col 5 |
| 3 | <a href=http://ww.yahoo.com/r/bu> | Row 3, col 8 |
| 4 | <a href=http://ww.yahoo.com/r/cu> | |
| 5 | <a href=http://ww.yahoo.com/r/ci> | |
| 6 | <a href=http://ww.yahoo.com/r/ed> | |
| 7 | <a href=http://ww.yahoo.com/r/nm> | |
| 8 | <a href=http://ww.yahoo.com/r/ar> | |
| 9 | <a href=http://ww.yahoo.com/r/rs> | |
| 10 | <a href=http://ww.yahoo.com/r/en> | |

Fig. 9

INTERACTIVE MEDIA SYSTEM

The present invention is based on the provisional Patent Application, Ser. No. 60/438,817, filed on Jan. 10, 2003, titled “Interactive media system”.

FIELD OF THE INVENTION

The present invention relates to the field of interactive media systems, particularly to the interactive media systems, such as TV, VCR, computers, Internet web publish, video, movies, cell phones or game console.

BACKGROUND OF THE INVENTION

With the development of technology, especially Internet and digital TV, interactive media has become increasingly popular. Right now, the most widely used interactive media are the web pages or web browsers. In the web pages, there are many hyperlinks embedded. When the users click on the hyperlinks, it may go or submit to the other web pages. By using these embedded hyperlinks, the contents in web pages are interactive, and become more valuable to the users. In order to bring the successful story of Internet to TV, video or movies, many new technologies have been developed to put some things like hyperlinks in the TV programs or movies, allowing the users to interact with the content publishers. Here TV is digital TV. For example, on the TV, there is a toy advertisement. When the users use the mouse or the like to click on the hyperlinks, it brings the users to the buy or detail information page.

However, putting hyperlinks into the contents in TV, video, or game programs usually need broadcasting protocols or standard change. It costs a lot. In addition, the two-way connection is required for the receiving terminal or device. However, most users are just using one-way connection to receive the TV signals, such as regular public TV or Satellite TV. For the existing TV, especially analog TV broadcasting systems, hyperlinks cannot be added into its contents.

When people use PCs or Laptop computers to look for or view information through the Internet, they often use the mouse to click on or scroll the browser. However, when people use TV to view the information from Internet, they need something different than a mouse. Therefore, the so-called smart device has been invented, which is a small computer display device. One of the disadvantage of this kind of smart device is it will add a lot of cost to TV and the like. Another disadvantage of this kind of smart device is it cannot be in a very small size, like regular remote control.

At home, TVs are not the only electronic devices. We may have desktop or laptop computers, PDAs, cellular/regular phones, game consoles, VCRs, DVD players, mp3 players, and singing or karaoke machines. The current interactive media systems are only allow you to interact with the same devices.

When people use TVs to browse on Internet, they have to use a mouse-like device to move the cursor on the big TV screen. However, moving a small cursor on a big screen is not convenient for many people, especially older people. People have watched TV for years by just pressing buttons on a small remote control, and many of them still prefer pressing keys or buttons to browse on Internet on a small remote control or the like. When comparing the regular TV remote control, the so-called smart device is not small enough for the most people.

SUMMARY OF THE INVENTION

It is therefore the objects of the present invention are intended to overcome the drawbacks of the conventional art.

Accordingly, an object of this invention is to provide a new and improved interactive media system, which allows the user to interact through any of the devices, including the devices which are not the device receiving the broadcasting signals.

Another object of the present invention is to provide a new and improved interactive media system, which does not require the current broadcasting protocols or standards to be changed.

Another object of the present invention is to provide an interactive media system, which is even suitable for the current analog broadcasting system.

Another object of the present invention is to provide an interactive media system, which is more suitable for people interacting with media broadcasting system.

Another object of the present invention is to provide an interactive system, which is suitable for people interacting with the media broadcasting system by using small remote control unit.

Another object of the present invention is to provide an interactive media system, which is more suitable for people interacting with media broadcasting system by just pressing number keys on a small remote control unit.

Another object of the present invention is to provide an interactive media system, which is more suitable for people browsing through the Internet by just pressing keys or buttons on a small remote control unit.

Another object of the present invention is to provide an interactive media system, which allows people to browse on Internet through big TV screen by just pressing keys or buttons, and without requiring any changes on the current Internet system.

Another object of the present invention is to provide an interactive media system, which allows people to browse on Internet through big TV screen by just pressing keys or buttons, and without requiring any change on the process of publishing web pages.

In accordance with the present invention, an interactive media system includes

A broadcasting or sending device for broadcasting or sending content signals;

A receiving device for receiving the said content signals;

Wherein, the content signals include the screen related action codes which include device type, action type and the detail action information; and the receiving device includes means for storing the reference address for other home electronic devices, and a trigger means for the users to start interacting with the interactive media system; and the receiving device are wired or wireless connected to those other home electronic devices; when the user clicks or presses the trigger means, the receiving device will read the action codes coming with the screen contents, and based on the device type and the reference address from the reference address means, send the action type and the action detail information to the designated home electronic device, and perform the action on the designated home electronic device.

In accordance with the present invention, the said action codes may be the part of the contents so that existing broadcasting protocols or standards need no change; the receiving device further includes a contents scanning unit for scanning out the action codes from the contents.

In accordance with the present invention, the said action codes may be represented by serial graphic patterns, which can be scanned and translated by the said scanning unit.

In accordance with the present invention, the said receiving device may further include a memory unit for storing the information of any action type command in the screen, and the other command-related information such as the sequence or order, the position of the command.

In accordance with the present invention, the said receiving device may further include a controller unit, by which users control the receiving device.

In accordance with the present invention, an interactive media system includes

A device for receiving data from or sending data to a host center through a wired or wireless connection, or Internet;

Wherein the said device includes

Process Unit for processing data and generating the data for displaying;

Storage or memory means storing the data for displaying;

Displaying unit for displaying based on the data in the said memory means;

Said device further includes a storage or memory means for storing the commands that are obtained from the said received data;

Said process unit will automatically assign a number or letter to each the said command and store the assigned related numbers or letters into the commands storage or memory means, Said displaying unit will display the said assigned numbers or letters next to, overlapping, or above the symbols, such as images or texts, representing the commands, on screen;

When a user presses a key on the remote control, the process unit will find the particular command based on the user pressed key number or letter, and execute the command.

The present invention is described in the detail below, together with its further objectives, features, and advantages, in conjunction with the following drawings:

BRIEF DESCRIPTION OF THE DRAWINGS

FIG. 4 shows some examples of the action codes in accordance with the present invention.

FIG. 5 shows some examples of the data in the address unit in accordance with the present invention.

FIG. 7 shows an example screen in prior art.

FIG. 8 shows an example screen in accordance with the present invention.

FIG. 9 shows an example table storing the related commands for the keystroke in FIG. 8.

DETAILED DESCRIPTION OF THE INVENTION

Figure 1:
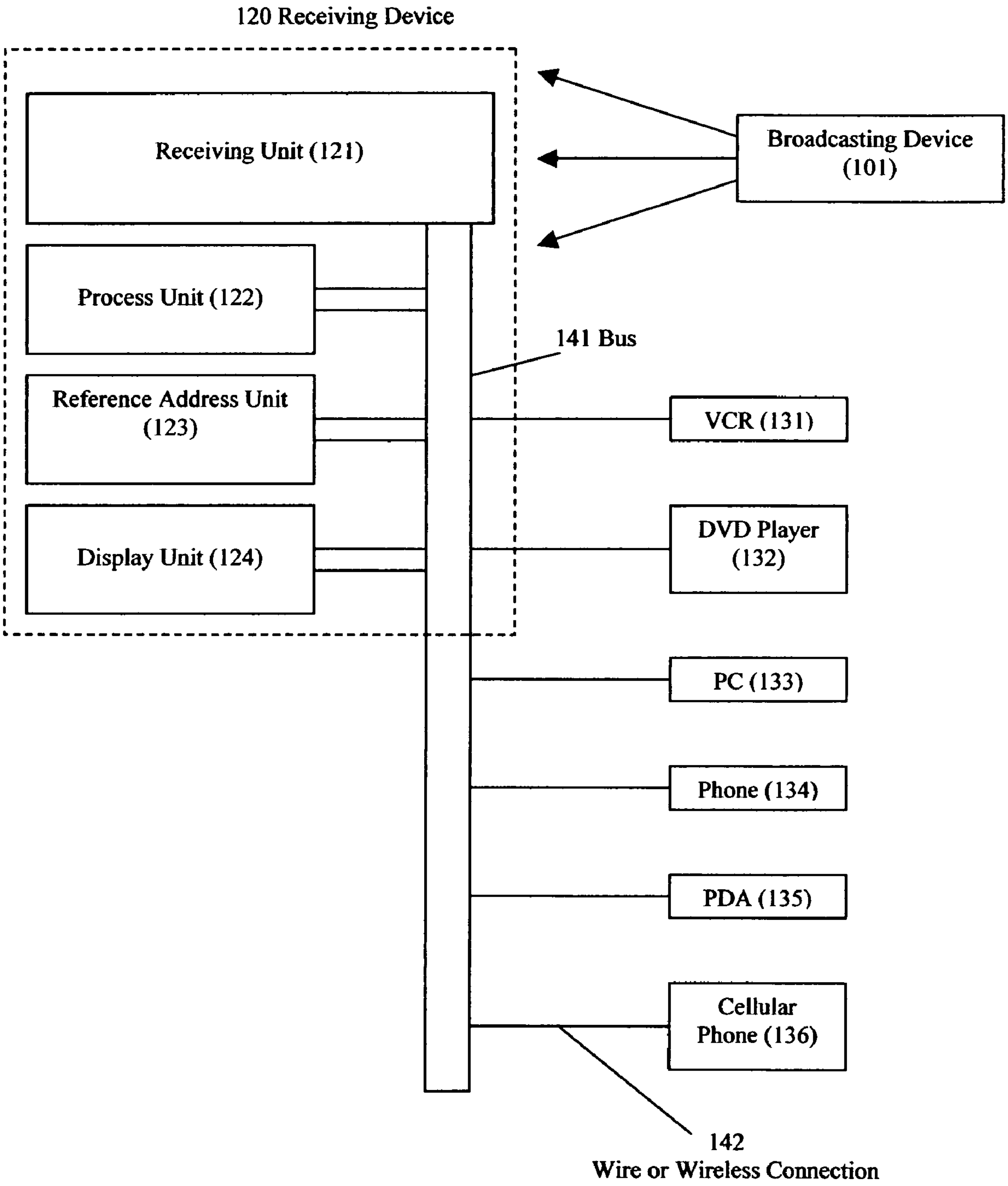
FIG. 1 is a schematic drawing showing an interactive media system in accordance with the present invention.

Referring now to the drawings, FIG. 1 shows an interactive media system, which includes a one-way broadcasting device 101 and receiving device 120. Receiving device includes receiving unit 121, process unit 122, reference address unit 123, and display unit 124. Data and address bus 141 connects to Receiving device 121, process unit 122, reference address unit 123, and display unit 124 together. VRC 131, DVD player 132, PC 133 Phone 134 PDA 135 Cellular phone 136, etc., are wired or wireless connected to the receiving device 101 by wire or air 142.

The interactive media broadcasting system shown in FIG. 1, broadcasting device 101, which may be either TV stations or cable TV carriers, broadcasts the contents. Receiving device includes receiving unit 121, process unit 122, reference address unit 123, and display unit 124. Receiving device may be TV or TV set top box, and receives the contents signals. When the user sees a good preview TV program on TV (display unit 124), for example NBA basketball game, he or she presses or clicks the trigger key to interact with TV. Here, the trigger key may be a button on the remote controller or remote keyboard. Process unit 122 processes the received signals and filters out the action codes from the content signals. The action codes include device type, action type, and other detail action information such as start time and ending time. Process unit 122 looks for the address from address unit 123 of the device, which matches the device in action codes, and sends the action codes to the device. For example, the received action codes are as follows: action device is VCR, action type is record, start time 7:30 pm, ending time 9:30 pm, and the detail information Is channel ESPN. Confirmed by the user, the process unit 122 will send the received action codes to VCR 131, and set recording time and channel based in action codes information. In another example, the action codes information is that device type is PC, action type is www.order.com, and action detail is 76ers's ticket. Confirmed by the user, the browser will automatically open with URL=www.order.com?t!pe=76ersticket.

In the above mentioned interactive media system, the action codes can be broadcasted with the content signals. For example, action codes can be put in the spare space in the transmission stream, or intervals between the frames or screens. The media carrier for broadcasting media and the manufacturers for making the receiving device should agree on the protocols for the interactive broadcasting. In FIG. 1, 101 is a one-way broadcasting device. Of course, it can also be a two-way system.

The following is an example for action codes:

<PRNPRT (detail information)>

Figure 2A:
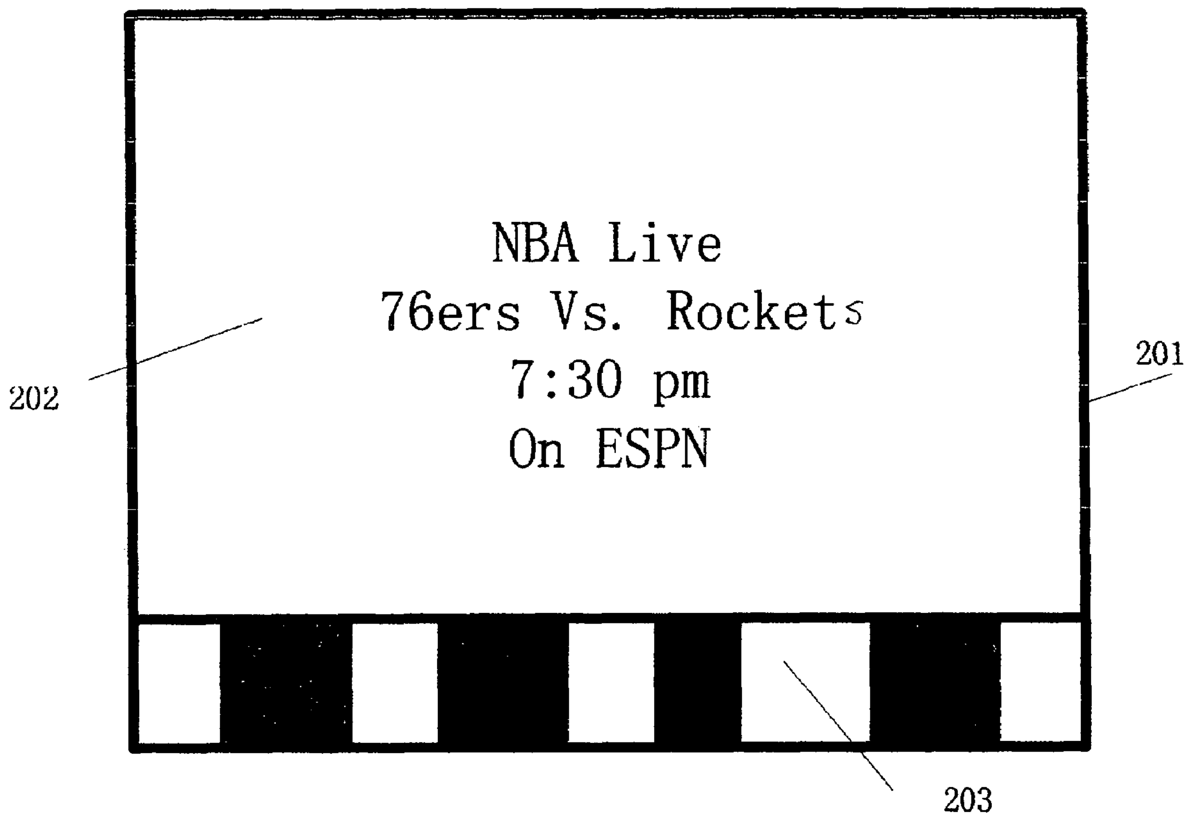
FIG. 2A is a schematic illustration of the action codes coming with the TV contents in accordance with the present invention.

The first 3 letters are the device code. PRN is printer. The second 3 letters are the action type. PRT is printing. This action codes tell the TV to send the contents to the printer. The detail information may be a cooking recipe. It of course, the action codes also can send the recipe to an electronic cooking machine. That means, when a user watches a cooking program on TV, he or she can get the recipe to print or to download it to the cooking machine just by pressing one button, FIG. 2A shows another example in accordance with the present invention. 201 is TV screen showing a TV preview for a live NBA basketball game. 203 is a part of the screen, and it is something like graphic bar codes. In this example, the interactive media system further includes a scanning unit (FIG. 3, 325). The scan unit is able to read the action codes information from the bar code like graphics at the bottom of the screen in FIG. 2.

Figure 2B:
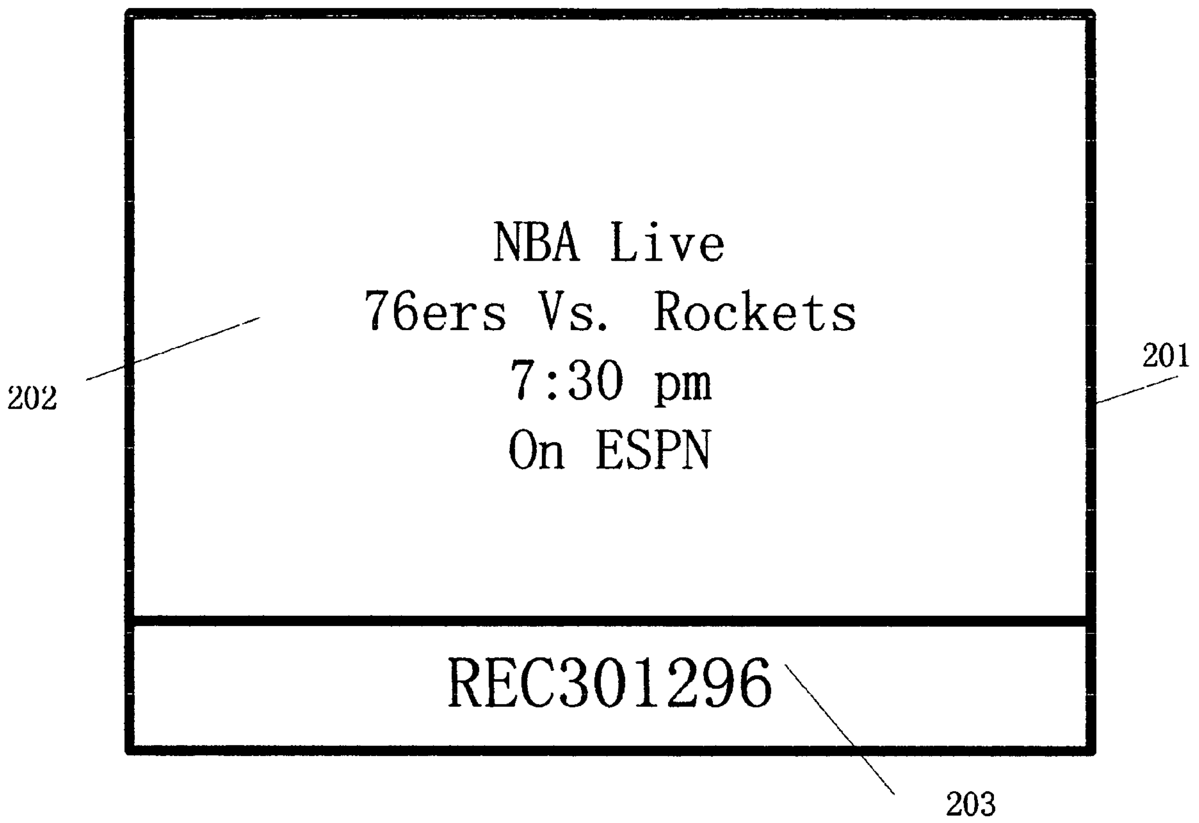
FIG. 2B is another schematic illustration of the action codes coming with the TV contents in accordance with the present invention.
Figure 3:
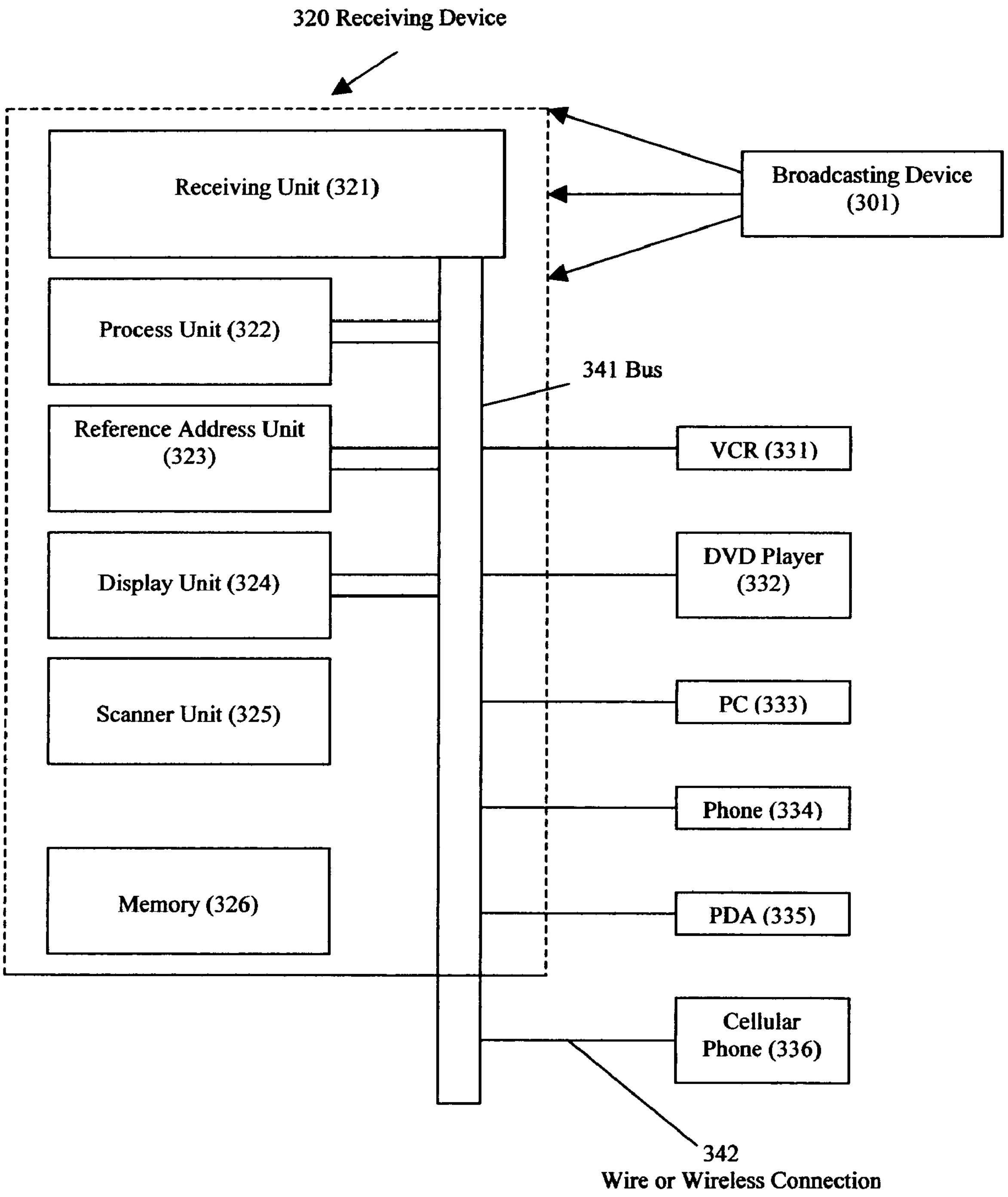
FIG. 3 is a schematic drawing showing an interactive media system in accordance with the present invention.

FIG. 2B shows another example in accordance with the present invention. 201 is the TV screen showing a TV preview for a live NBA basketball game. 203 is part of the screen, and it is the combination of the code and the numbers. In this example, the interactive media system further includes a scanning unit (FIG. 3, 325). The scan unit is able to read the action codes information by scanning the code and the numbers at the bottom of the screen in FIG. 2B.

Figure 2C:
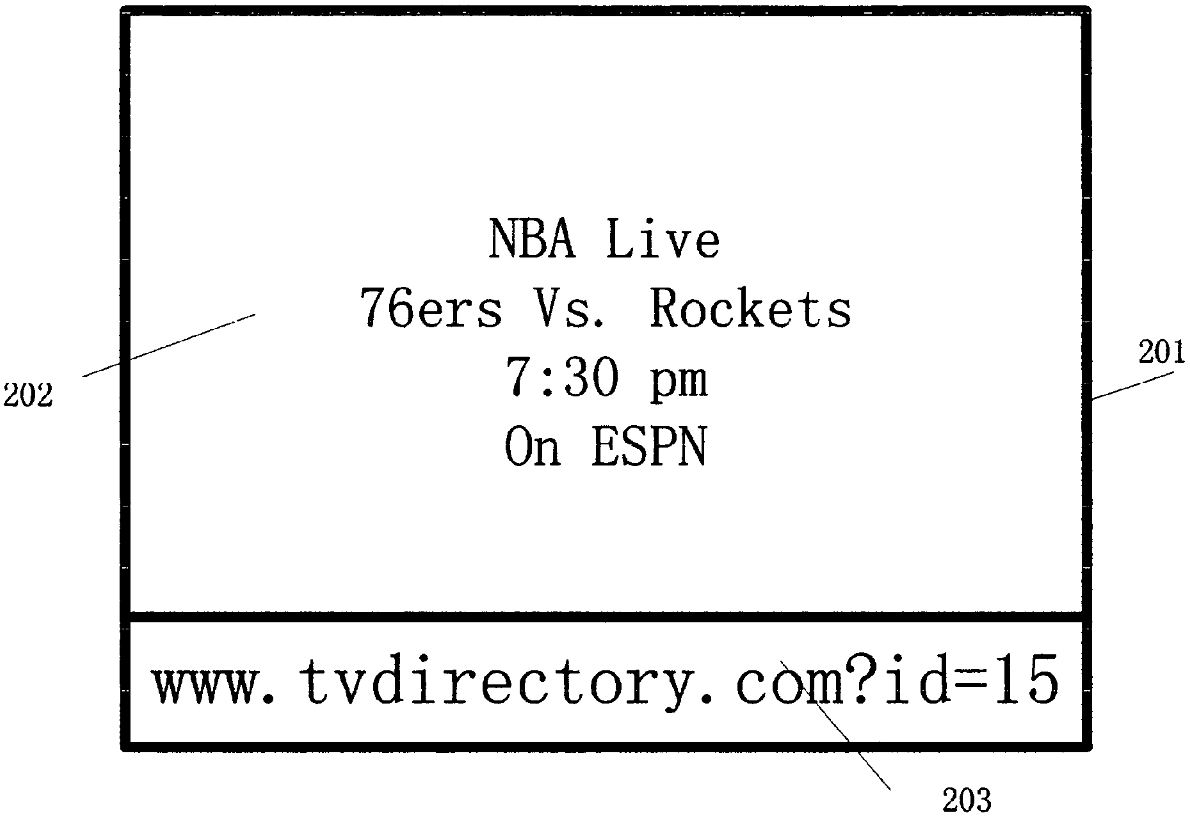
FIG. 2C is another schematic illustration of the action codes coming with the TV contents in accordance with the present invention.

FIG. 2C shows another example in accordance with the present invention. 201 is the TV screen showing a TV preview for a live N BA basketball game. 203 is part of the screen, and it is something like the URL. In this example, the interactive media system further includes a scanning unit (FIG. 3, 325). The scan unit is able to read the URL at the bottom of the screen in FIG. 2C.

In FIG. 2A, 2B and 2C, the digital bar codes are easy to be scanned and it allows larger errors in the transmission. The codes and numbers are easy to be understood. URL can directly lead the user to the related web page, and make further processes that are more complicated.

Although, in the examples shown in FIG. 2A, 2B and 2C, for illustration reasons, the digital bar codes or the command codes are visible to people, they may not be visible to people, in practice, as long as they can be recognized or read by the scanning unit in the interactive media system of the present invention.

FIG. 3 shows an interactive media system, which includes a one-way broadcasting device 301 and receiving device 320. Receiving device 320 includes receiving unit 321, process unit 322, reference address unit 323, display unit 324, scanner unit 325, and memory 326. Data and address bus 341 connects Receiving device 321, process unit 322, reference address unit 323, and display unit 324 together. VRC 331, DVD player 332, PC 333 Phone 334 PDA 335 Cellular phone 336, etc., are connected to the receiving device 101 by wire or air 342. In this example, broadcasting device 301 broadcasts the content by using the existing protocol without any change. Memory 326 is used for storing the current action codes, which relate to the current screen. Memory 326 may be cleaned every five seconds or may be rewritten every time the new screen scans. When user presses or click the trigger key or button, scanner unit 325 will scan the bottom part of the screen and read the action codes information. It will store the action codes information into memory 326. Process unit 322 will look for the address from address unit 323 and send the action codes to the designated device. For example, TV advertisement asks for email or instant message response. The action codes will be sent to cellular phone with the AOL ICQ address. The user can then send the message to the TV advertiser.

FIG. 4 shows some typical action code(s) examples. For example, in the action code for VCR recording, device type is VCR, action type is RECORD, start time is 7:30 pm, ending time is 9:30 pm detail information is CHN 41. Some other information may be included, such as action date. In the TV program download action code, device type is TV, action code is downloaded and detail is the 76ers' previous game.

FIG. 5 shows an example in the reference address unit. The information includes, in the table, device name, device type, address, etc.

In FIG. 1 and FIG. 3, the broadcasting device is a one-way broadcasting device. However, it may have some channels in two-way broadcasting, such as two-way cable connection. When receiving the content from one-way broadcasting, the user can press the trigger button to switch to two-way connection, and then interact with the content provider on TV.

Figure 6:
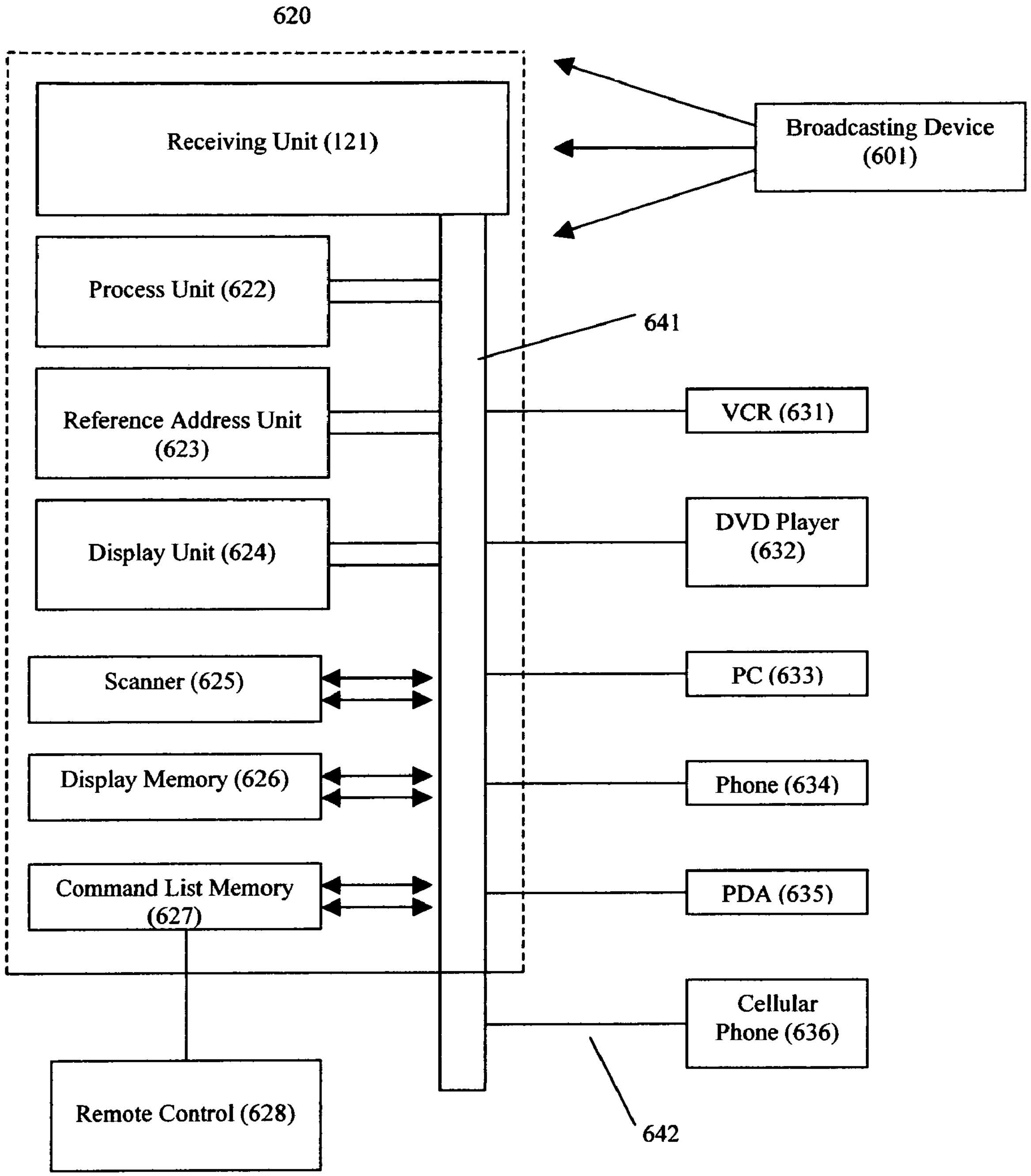
FIG. 6 is a schematic illustration of an interactive digital TV system in accordance with the present invention.

FIG. 6 shows an interactive media system, which includes content source 601 and receiving device 620. Content source 601 is usually any web site, such as yahoo.com. Receiving device 620, here, may be a digital TV system, PC, or the like. Through Internet connection, receiving device 620 connects to content source 601. Receiving device 620 includes receiving unit 621, process unit 622, reference address unit 623, display unit 624, scanner unit 625, displaying memory 626 and command list memory 627. Data and address bus 641 connect Receiving device 621, process unit 622, reference address unit 623, display unit 624, scanner unit 625, displaying memory 626 and command list memory 627 together. VRC 631, DVD player 632, PC 633 Phone 634, PDA 635, and Cellular phone 636, etc., are connected to the receiving device 620 by wire or air 642. Display Memory 626 is used for storing the display information, which is similar to the memory in graphic card in a PC. Scanner unit 625 will scan the screen and read the action codes information, such as html tag information, and put the action code information and its screen position into position memory 627. When the user presses a switch key on the remote controller 628, process unit 622 will search in the command list memory (627), and find the positions and order numbers or letters. Then, the system will display the order numbers or letters at the position near to or next to or overlap or above the related tags or symbols (graphics or texts). The user will, based on the displayed numbers or letters, press the numbers or letters on the remote control. The system will then, based on the tag information, go to the next page. Therefore, the users are able to browse on Internet by just using a small number keypad, which is usually on the controller. On the remote control 628, there is a switch button allowing users to hide or display the order numbers or letters on the screen.

FIG. 7 shows a normal display of an Internet page (yahoo.com) on a display device, such as digital TV or a personal computer screen. On this screen, users need to use a mouse or the like to click on the desired link, and go to the next page. It is very convenient to use a mouse to browse on Internet in front of a computer screen, which is usually a small screen, and on the top of the user's desk. However, it is not easy to use a mouse to click on a TV screen, especially on a big TV, such as HDTV, home theater screen, or flat panel screen. For some people, especially for those older people, the mouse is not a user-friendly device. They would prefer to just press button on TV remote control.

FIG. 8 shows example screen display in accordance with the present invention. On this screen, the numbers are automatically generated and displayed on the screen. In this example, the process unit (622), in FIG. 6, generates number 2 for "Regional" hyperlink, number 3 for "Business & Economy" hyperlink, and etc. The process unit (622) stores the assigned or generated numbers and the related commands, including the relationship, into the command list memory (627). When a user presses a key button, for example, the number 2 button, from the key controller (remote controller or keyboard), the process unit (622) will, based on the number 2, find the particular command for "Regional" link, and execute the command and bring the user to the "Regional" page.

FIG. 9 shows an example of the data stored in the command list memory. In left column, it shows numbers that are assigned or generated by the process unit (622). In the middle column, it shows the number related commands. In the right column, it shows the displaying position.

Although the invention has been described with reference to the above-described embodiments and examples, it will be appreciated that many other variations, modifications, and applications may be devised in accordance with the broad principles of the invention disclosed herein. The invention, including the described embodiments and examples and all related variations, modifications and applications is defined in the following claims.

Therefore, the forgoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. An interactive media system includes means for receiving or downloading a web page, which includes one or more hypertext links, from a host center through a wired or wireless connection, or Internet;

means for displaying the web page;

a remote controller for allowing users to control the system remotely;

wherein the said device further includes:

means for scanning the received web page contents and reading the hypertext links and the screen positions for the links in the page;

means for generating and assigning an order number or letter to each of the read links in the page;

means for storing the read links, the corresponding assigned numbers or letters, and the corresponding screen position of the assigned numbers or letters for the links;

means for processing to display or to hide the order numbers or letters near the corresponding links when web page is displayed;

wherein said remote controller further includes one or more number or letter keys for allowing users to select the order numbers or letters to switch the current web page to the next page pointed by the corresponding link, and a switch button for controlling to hide or to display said order numbers or letters for said hypertext links on the displaying means; and said system further includes means for controlling said processing means to hide or display the order numbers or letters based on user's control through said switch button in the remote controller; and means for, in respond to the order number or letter selected users through the remote controller, to find the corresponding hypertext link and switch the current display web page to the hypertext link pointed web page.

* * * * *